US011359656B2

(12) United States Patent
Cerino et al.

(10) Patent No.: US 11,359,656 B2
(45) Date of Patent: Jun. 14, 2022

(54) LOAD DISTRIBUTING SELF-LOCKING MOUNT PIN

(71) Applicant: United Technologies Corporation, Farmington, CT (US)

(72) Inventors: Joseph N. Cerino, Middletown, CT (US); Yong C. Luo, Manchester, CT (US); Juan Pablo Suarez, Boynton Beach, FL (US)

(73) Assignee: RAYTHEON TECHNOLOGIES CORPORATION, Farmington, CT (US)

( * ) Notice: Subject to any disclaimer, the term of this patent is extended or adjusted under 35 U.S.C. 154(b) by 926 days.

(21) Appl. No.: 16/149,702

(22) Filed: Oct. 2, 2018

(65) Prior Publication Data

US 2020/0102975 A1    Apr. 2, 2020

(51) Int. Cl.
*F01D 25/28* (2006.01)
*F16B 5/02* (2006.01)

(52) U.S. Cl.
CPC ............... *F16B 5/02* (2013.01); *F01D 25/28* (2013.01)

(58) Field of Classification Search
CPC . F16C 11/045; F16C 11/0614; F16C 11/0604; Y10T 29/49948
See application file for complete search history.

(56) References Cited

U.S. PATENT DOCUMENTS

| 987,853 | A | * | 3/1911 | Bryan | ....................... F16B 5/02 403/11 |
| 1,296,778 | A | | 3/1919 | Delling | |
| 3,525,448 | A | | 8/1970 | Bauer | |
| 4,048,898 | A | | 9/1977 | Salter | |
| 4,491,436 | A | | 1/1985 | Easton | |
| 4,600,343 | A | | 7/1986 | Frerejacques | |
| 4,897,004 | A | | 1/1990 | Norton | |
| 5,320,443 | A | * | 6/1994 | Lien | ........................ E02F 9/006 403/154 |
| 5,848,874 | A | * | 12/1998 | Heumann | ............... F01D 9/042 415/189 |

(Continued)

FOREIGN PATENT DOCUMENTS

EP    0120327 A1    10/1984
EP    1481766 A1    12/2004

(Continued)

OTHER PUBLICATIONS

European Search Report for Application No. EP 19 18 9893.

*Primary Examiner* — Jason L Vaughan
*Assistant Examiner* — Amanda Kreiling
(74) *Attorney, Agent, or Firm* — Cantor Colburn LLP

(57) ABSTRACT

A mounting pin assembly includes a first mounting component. The assembly also includes a second mounting component having a first leg located on a first side of the first mounting component and a second leg located on a second side of the first mounting component. The assembly further includes a mount pin extending through an aperture of the first leg, an aperture of the first mounting component, and an aperture of the second leg, the mount pin having a conical shoulder region in contact with a chamfer of the second leg. The assembly yet further includes a self-locking nut plate threaded to the mount pin.

16 Claims, 2 Drawing Sheets

(56) References Cited

U.S. PATENT DOCUMENTS

| | | | |
|---|---|---|---|
| 7,416,362 B2 * | 8/2008 | North | F16B 5/0241 |
| | | | 267/150 |
| 8,794,587 B2 | 8/2014 | Cant et al. | |
| 2007/0237646 A1 * | 10/2007 | Shi | F01D 5/025 |
| | | | 416/244 A |

FOREIGN PATENT DOCUMENTS

| GB | 791555 A | * | 3/1958 | .......... F16C 11/0614 |
|---|---|---|---|---|
| GB | 791555 A | | 3/1958 | |

* cited by examiner

LOAD DISTRIBUTING SELF-LOCKING MOUNT PIN

STATEMENT OF FEDERAL SUPPORT

This invention was made with Government support awarded by the United States. The Government has certain rights in the invention.

BACKGROUND

Exemplary embodiments pertain to the art of gas turbine engines and, more particularly, to a load distributing self-locking mount pin for joining gas turbine engine components.

Pin mounting strategies are utilized for mounting components to cases and other structures when there is an expected difference in temperature which would otherwise cause a thermal fight between the two. The pins are strategically configured to avoid over-constraining the component and thus allowing for differential thermal growth without inducing thermal stress. The load distributing self-locking mount pin was designed to be a lighter weight alternative to existing "hook and latch" type pin designs currently in use on some engines. These pins are used to mount "line replaceable components" which must be replaceable in a short amount of time, often without removal of the engine from the aircraft.

The "hook and latch" design allows the satisfaction of both a line replaceable component requirement and that no loose small fasteners be fully removed during the replacement of one of these components as well as a self-locking and anti-rotation requirement for the pin. An alternative design is to include a captured self-locking thread, which can be in the form of, but is not limited to a self-locking nut plate or insert in one leg of the matching clevis. In this configuration the pin can be comprised of a shouldered section with a threaded end which is installed into the self-locking feature on the clevis leg and thus anti-rotated. A shortfall of this design is the potential installation binding and stress associated with misalignment between the insert and the two clevis holes, which may include bushings, due to various tolerances deriving from the manufacturing processes. Some of these issues can be mitigated by increasing clearances on the hole or bushing sharing the clevis leg with the self-locking thread. The potential shortfall of this solution is that a larger percentage of the load is then transferred through the bolt threads in shear, which is structurally undesirable.

BRIEF DESCRIPTION

Disclosed is a mounting pin assembly. The assembly includes a first mounting component. The assembly also includes a second mounting component having a first leg located on a first side of the first mounting component and a second leg located on a second side of the first mounting component. The assembly further includes a mount pin extending through an aperture of the first leg, an aperture of the first mounting component, and an aperture of the second leg, the mount pin having a conical shoulder region in contact with a chamfer of the second leg. The assembly yet further includes a self-locking nut plate threaded to the mount pin.

In addition to one or more of the features described above, or as an alternative, further embodiments may include that wherein an angle of the chamfer of the second leg corresponds to an angle of the conical shoulder region.

In addition to one or more of the features described above, or as an alternative, further embodiments may include that the conical shoulder region extends between a first outer surface segment of the mount pin and a second outer surface segment of the mount pin, the first outer surface segment having a larger diameter than the second outer surface segment.

In addition to one or more of the features described above, or as an alternative, further embodiments may include a spherical bearing disposed within the aperture of the first mounting component and adjacent the first outer surface segment of the mount pin.

In addition to one or more of the features described above, or as an alternative, further embodiments may include a bushing disposed within the aperture of the first leg and adjacent the first outer surface segment of the mount pin.

In addition to one or more of the features described above, or as an alternative, further embodiments may include a bushing disposed within the aperture of the second leg and adjacent the second outer surface segment of the mount pin.

In addition to one or more of the features described above, or as an alternative, further embodiments may include that the second mounting component is a clevis coupled to the first mounting component.

Also disclosed is a method of pin mounting components. The method includes forming a mount pin having a conical shoulder region. The method also includes extending the mount pin through a first mounting component and a second mounting component until the conical shoulder region is in contact with a chamfer of the second mounting component. The method further includes locking the pin with a self-locking nut plate threaded to the mount pin.

In addition to one or more of the features described above, or as an alternative, further embodiments may include that extending the mount pin through the first mounting component and the second mounting component comprises extending the mount pin through an aperture of a first leg of the second mounting component, through an aperture of the first mounting component, and through an aperture of a second leg of the second mounting component, the first leg located on a first side of the first mounting component and the second leg located on a second side of the first mounting component.

In addition to one or more of the features described above, or as an alternative, further embodiments may include that the chamfer defines a lead-in region of the aperture of the second leg.

In addition to one or more of the features described above, or as an alternative, further embodiments may include that forming the mount pin comprises forming the apertures of the second mounting component and forming the chamfer of the second leg in a single concurrent process with a chamfered drill bit.

In addition to one or more of the features described above, or as an alternative, further embodiments may include matching an angle of the conical shoulder region with an angle of the chamfer.

Further disclosed is a gas turbine engine including a compressor section, a combustor section, a turbine section, and a mounting pin assembly joining components of the gas turbine engine. The mounting pin assembly includes first mounting component. The mounting pin assembly also includes a second mounting component having a first leg located on a first side of the first mounting component and a second leg located on a second side of the first mounting component. The mounting pin assembly further includes a mount pin extending through an aperture of the first leg, an aperture of the first mounting component, and an aperture of the second leg, the mount pin having a conical shoulder region in contact with a chamfer of the second leg, wherein an angle of the chamfer corresponds to an angle of the conical shoulder region. The mounting pin assembly yet further includes a self-locking nut plate threaded to the mount pin.

In addition to one or more of the features described above, or as an alternative, further embodiments may include that the conical shoulder region extends between a first outer surface segment of the mount pin and a second outer surface segment of the mount pin, the first outer surface segment having a larger diameter than the second outer surface segment.

In addition to one or more of the features described above, or as an alternative, further embodiments may include a spherical bearing disposed within the aperture of the first mounting component and adjacent the first outer surface segment of the mount pin.

In addition to one or more of the features described above, or as an alternative, further embodiments may include a bushing disposed within the aperture of the first leg and adjacent the first outer surface segment of the mount pin.

In addition to one or more of the features described above, or as an alternative, further embodiments may include a bushing disposed within the aperture of the second leg and adjacent the second outer surface segment of the mount pin.

In addition to one or more of the features described above, or as an alternative, further embodiments may include that the second mounting component is a clevis coupled to the first mounting component.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1:
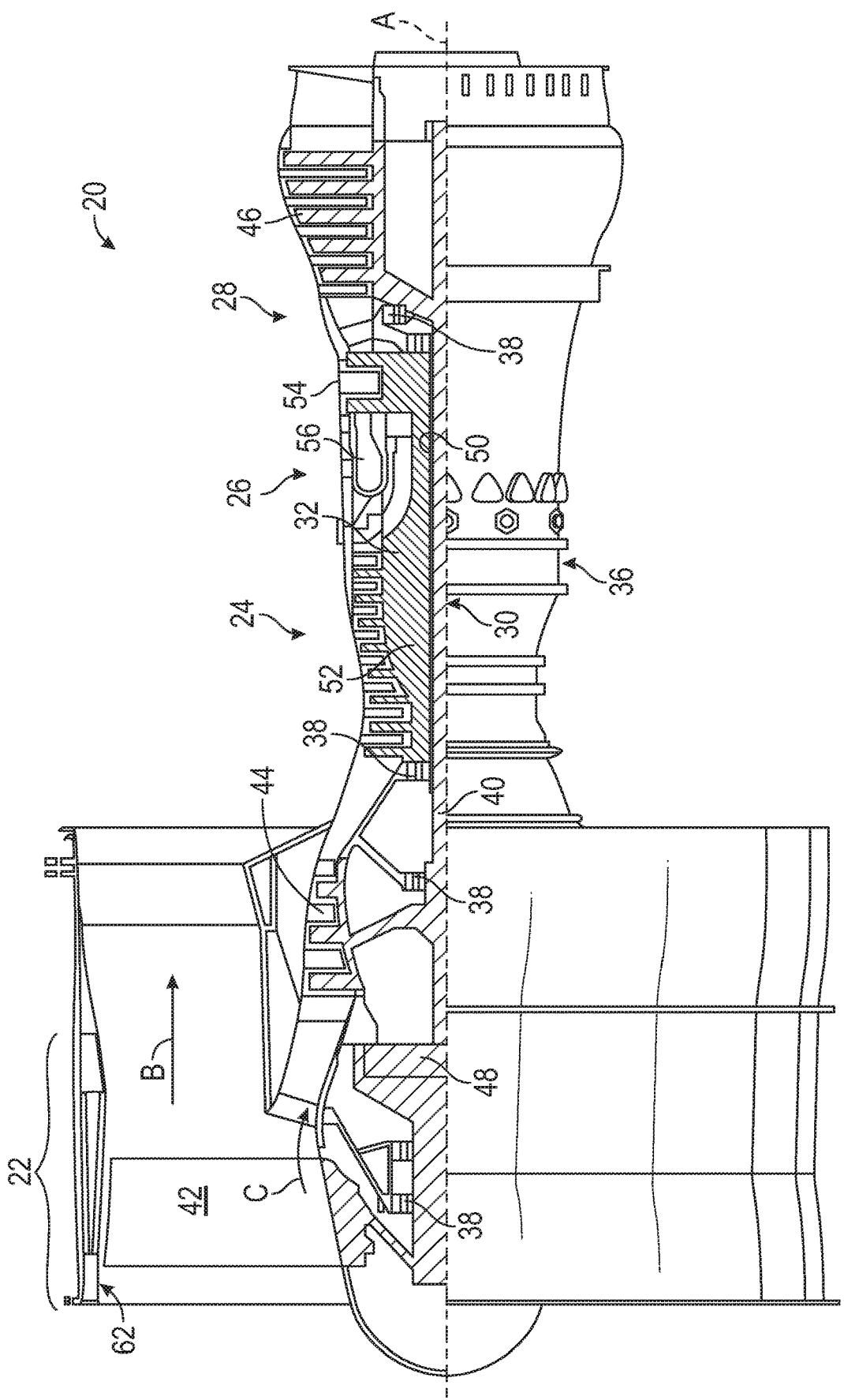
FIG. 1 is a side, partial cross-sectional view of a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. The fan section 22 drives air along a bypass flow path B in a bypass duct, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a low pressure compressor 44 and a low pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a high pressure compressor 52 and high pressure turbine 54. A combustor 56 is arranged in exemplary gas turbine 20 between the high pressure compressor 52 and the high pressure turbine 54. An engine static structure 36 is arranged generally between the high pressure turbine 54 and the low pressure turbine 46. The engine static structure 36 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five (5:1). Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present disclosure is applicable to other gas turbine engines including direct drive turbofans.

A significant amount of thrust is provided by the bypass flow B due to the high bypass ratio. The fan section 22 of the engine 20 is designed for a particular flight condition— typically cruise at about 0.8 Mach and about 35,000 feet (10,688 meters). The flight condition of 0.8 Mach and 35,000 feet (10,688 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(\text{Tram } ° \text{ R})/(518.7° \text{ R})]^{0.5}$. The "Low corrected fan tip speed" as disclosed herein according to one non-limiting embodiment is less than about 1150 ft/second (350.5 m/sec).

Figure 2:
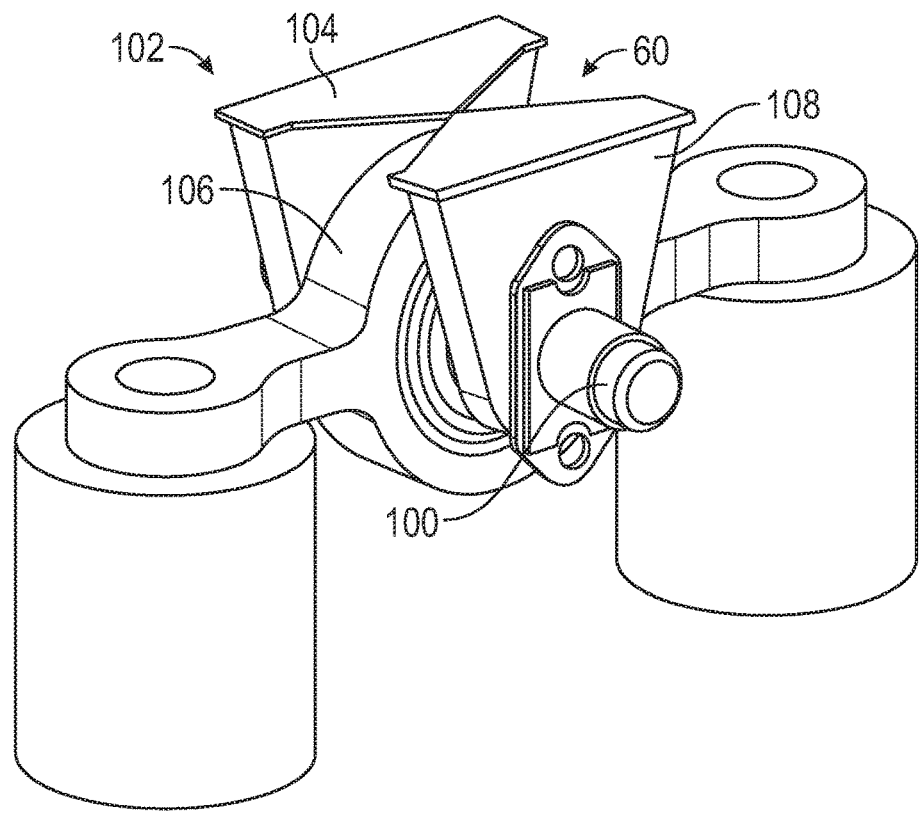
FIG. 2 is a perspective view of a component assembly coupled with a mount pin.

Referring to FIG. 2, a component assembly 60 of the gas turbine engine 20 is shown in an assembled and mounted condition, the mounting facilitated with a self-locking mount pin 100. The component assembly 60 may include any components that are typically supported with a pin to allow relative rotation of the components. In one non-limiting example, the self-locking mount pin 100 may be used with compressor stator support bushings, as it has been shown to work well in increasing the shear load capability and alignment due to no radial slop in the close tolerance hole. This is merely one example of where the embodiments described herein may be utilized. Any mechanical application involving a structural pin requiring anti-rotation may also benefit from the embodiments described herein.

Figure 3:
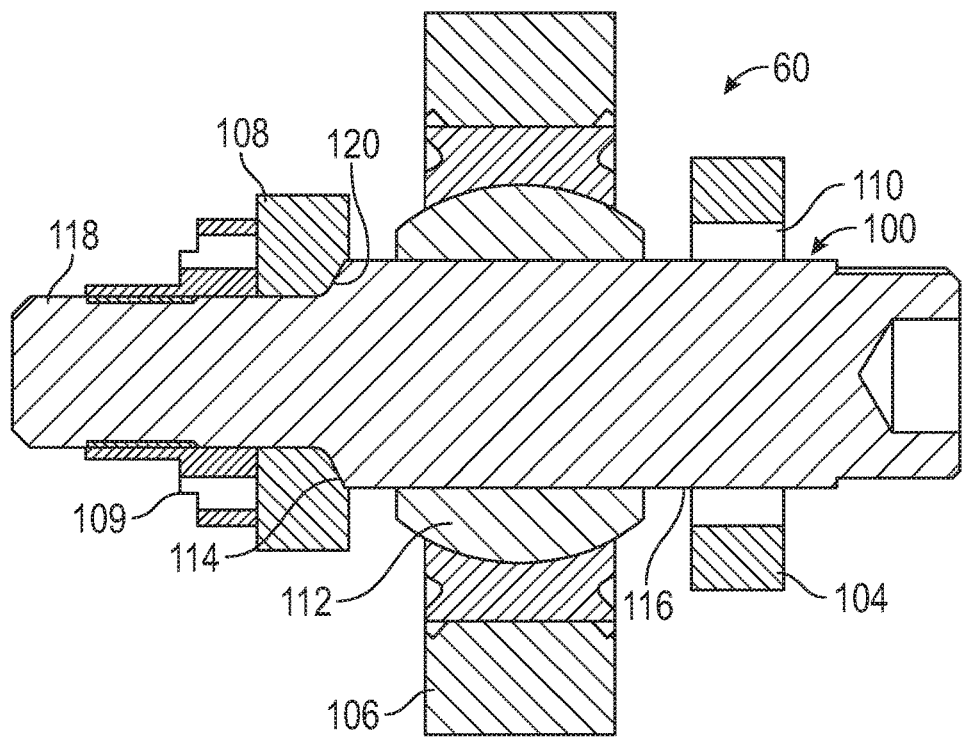
FIG. 3 is a cross-sectional view of the component assembly.

In the general illustrated embodiment of the component assembly 60 of FIGS. 2 and 3, a portion of a clevis 102 is shown for mounting via the self-locking mount pin 100. As shown, the mount pin 100 extends through a first clevis leg 104, a mounting component feature 106, a second clevis leg 108, and a self-locking nut plate 109. The first clevis leg 104 includes a bushing 110 disposed within an aperture of the first clevis leg 104 in some embodiments. A spherical bearing 112 is disposed within an aperture of the mounting component feature 106 in the illustrated embodiment. The bushing 110 and the spherical bearing 112 are the direct interfaces for the mount pin 100 in some embodiments.

The mount pin 100 is a shouldered pin that includes a chamfer region that is geometrically conical to form a conical shoulder 114. In particular, the chamfer region 114 is located at the shoulder of the mount pin 100 that joins a first outer surface segment 116 and a second outer surface segment 118 of the mount pin 100, with the second outer surface segment 118 having a smaller diameter than the first outer surface segment 116. The chamfer region is tightened into a matching conical chamfer 120 machined into the second clevis leg 108. Because the feature is conical, a component of the load passing through this portion of the mount pin 100 support is normal compressive loading on the conical feature, rather than only friction which relies on a high bolt preload to prevent slippage and loading through the threads. The second outer surface segment 118 includes threads that are engageable with the self-locking nut plate 109 to fix the axial position of the mount pin 100.

The mount pin 100 that distributes the load and is self-locking captures the weight reduction benefits of shouldered self-locking pin designs, while also improving the structural issues associated therewith. The weight savings is achieved by eliminating multiple components required for other mount pin assemblies, such as "hook and latch" mount assemblies. For example, elimination of a retention bolt and a hook and latch plate is beneficially achieved. This is achieved by incorporating the conical chamfer region 114 at the shoulder, rather than employing a right angle step at the shoulder.

In some embodiments, a specialized, but simple, chamfered drill bit can be made to drill all clevis apertures and chamfers in one concurrent process, thereby eliminating concentricity tolerances and thus significantly reducing residual assembly stress in the mount pin 100 and the clevis 102 features.

As described above, any mechanical application involving a structural pin requiring anti-rotation would benefit from the mount pin described herein. This includes applications where the minimization of weight is critical. The mount pin 100 may also be used in any application where a large thermal differential exists between two interfacing components. The mount pin 100 allows for unrestrained thermal growth which eliminates thermal stress between both components. This may include, but is not limited to, other aerospace applications in various propulsion systems and airframe components, automotive applications and industrial machinery applications.

The term "about" is intended to include the degree of error associated with measurement of the particular quantity based upon the equipment available at the time of filing the application. For example, "about" can include a range of ±8% or 5%, or 2% of a given value.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A mounting pin assembly comprising:
a first mounting component;
a second mounting component having a first leg located on a first side of the first mounting component and a second leg located on a second side of the first mounting component;
a mount pin extending through an aperture of the first leg, an aperture of the first mounting component, and an aperture of the second leg, the mount pin having a conical shoulder region in contact with a chamfer of the second leg; and
a self-locking nut plate threaded to the mount pin at the second leg.

2. The mounting pin assembly of claim 1, wherein an angle of the chamfer of the second leg corresponds to an angle of the conical shoulder region.

3. The mounting pin assembly of claim 1, wherein the conical shoulder region extends between a first outer surface segment of the mount pin and a second outer surface segment of the mount pin, the first outer surface segment having a larger diameter than the second outer surface segment.

4. The mounting pin assembly of claim 3, further comprising a spherical bearing disposed within the aperture of the first mounting component and adjacent the first outer surface segment of the mount pin.

5. The mounting pin assembly of claim 3, further comprising a bushing disposed within the aperture of the first leg and adjacent the first outer surface segment of the mount pin.

6. The mounting component of claim 3, further comprising a bushing disposed within the aperture of the second leg and adjacent the second outer surface segment of the mount pin.

7. The mounting pin assembly of claim 1, wherein the second mounting component is a clevis coupled to the first mounting component.

8. A method of pin mounting components comprising:
   forming a mount pin having a conical shoulder region;
   extending the mount pin through a first mounting component and a second mounting component until the conical shoulder region is in contact with a chamfer of the second mounting component; and
   locking the pin with a self-locking nut plate threaded to the mount pin;
   wherein the chamfer defines a lead-in region of the aperture of the second leg; and
   wherein forming the mount pin comprises forming the apertures of the second mounting component and forming the chamfer of the second leg in a single concurrent process with a chamfered drill bit.

9. The method of claim 8, wherein extending the mount pin through the first mounting component and the second mounting component comprises extending the mount pin through an aperture of a first leg of the second mounting component, through an aperture of the first mounting component, and through an aperture of a second leg of the second mounting component, the first leg located on a first side of the first mounting component and the second leg located on a second side of the first mounting component.

10. The method of claim 8, further comprising matching an angle of the conical shoulder region with an angle of the chamfer.

11. A gas turbine engine comprising:
    a compressor section;
    a combustor section;
    a turbine section; and
    a mounting pin assembly joining components of the gas turbine engine, the mounting pin assembly comprising:
      a first mounting component;
      a second mounting component having a first leg located on a first side of the first mounting component and a second leg located on a second side of the first mounting component;
      a mount pin extending through an aperture of the first leg, an aperture of the first mounting component, and an aperture of the second leg, the mount pin having a conical shoulder region in contact with a chamfer of the second leg, wherein an angle of the chamfer corresponds to an angle of the conical shoulder region; and
      a self-locking nut plate threaded to the mount pin.

12. The gas turbine engine of claim 11, wherein the conical shoulder region extends between a first outer surface segment of the mount pin and a second outer surface segment of the mount pin, the first outer surface segment having a larger diameter than the second outer surface segment.

13. The gas turbine engine of claim 12, further comprising a spherical bearing disposed within the aperture of the first mounting component and adjacent the first outer surface segment of the mount pin.

14. The gas turbine engine of claim 12, further comprising a bushing disposed within the aperture of the first leg and adjacent the first outer surface segment of the mount pin.

15. The gas turbine engine of claim 12, further comprising a bushing disposed within the aperture of the second leg and adjacent the second outer surface segment of the mount pin.

16. The gas turbine engine of claim 11, wherein the second mounting component is a clevis coupled to the first mounting component.

\* \* \* \* \*